US006596838B1

(12) United States Patent
Pinery et al.

(10) Patent No.: US 6,596,838 B1
(45) Date of Patent: Jul. 22, 2003

(54) SEPARATION METHOD AND DEVICE WITH SEMI-PERMEABLE MEMBRANES COMPRISING SULPHONATED POLYIMIDES

(75) Inventors: Michel Pinery, Montbonnot (FR); Gérald Pourcelly, Montpellier (FR); Régis Mercier, Higney (FR)

(73) Assignees: Commissariat A l'Energie Atomique, Paris (FR); Centre National de la Recherche, Paris Cedex (FR)

( * ) Notice: Subject to any disclaimer, the term of this patent is extended or adjusted under 35 U.S.C. 154(b) by 0 days.

(21) Appl. No.: 09/913,802

(22) PCT Filed: Feb. 17, 2000

(86) PCT No.: PCT/FR00/00392

§ 371 (c)(1), (2), (4) Date: Aug. 17, 2001

(87) PCT Pub. No.: WO00/48718

PCT Pub. Date: Aug. 24, 2000

(30) Foreign Application Priority Data

Feb. 18, 1999 (FR) .............................. 99 02001

(51) Int. Cl.[7] ........................ C08G 73/10; B01D 71/00; B01D 71/64
(52) U.S. Cl. ................... 528/170; 528/353; 528/171; 528/172; 528/173; 528/174; 528/176; 528/183; 528/185; 528/188; 528/220; 528/229; 528/350; 204/157.76; 204/157.81; 204/157.87; 204/450
(58) Field of Search .................. 528/353, 172, 528/173, 174, 176, 171, 170, 220, 229, 183, 185, 188, 350; 204/157.76, 157.81, 157.87, 450

(56) References Cited

U.S. PATENT DOCUMENTS 4,574,144 A * 3/1986 Yates, III et al. ............ 525/435
4,717,393 A * 1/1988 Hayes ............................ 55/16

(List continued on next page.)

FOREIGN PATENT DOCUMENTS

EP 0471650 2/1992
EP WO97/35902 10/1997 ........... C08G/63/78

(List continued on next page.)

Primary Examiner—P. Hampton-Hightower
(74) Attorney, Agent, or Firm—Pearne & Gordon LLP

(57) ABSTRACT

The invention relates to a semi-permeable membrane separation process and device in which the said membranes comprise sulphonated polyimides.

The present invention also relates to the use of sulphonated polyimide membranes in separation processes and devices using semi-permeable membranes. The said sulphonated polyimide comprises recurrent structures with the formula (In):

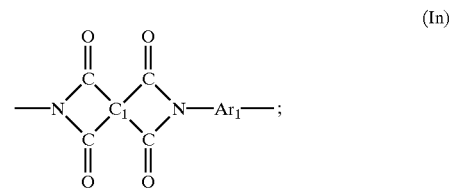

and recurrent structures with the formula (Im):

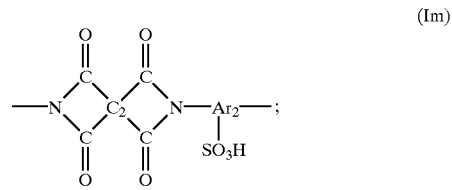

25 Claims, 1 Drawing Sheet

U.S. PATENT DOCUMENTS

| | | | |
|---|---|---|---|
| 5,074,891 A | * 12/1991 | Kohn et al. | 55/16 |
| 5,145,940 A | 9/1992 | Wernet et al. | 528/226 |
| 5,198,316 A | 3/1993 | Wernet et al. | 430/32 |
| 5,266,100 A | * 11/1993 | Simmons | 95/43 |
| 5,271,813 A | 12/1993 | Linkous | 204/129 |
| 5,618,334 A | * 4/1997 | Ozcayir et al. | 96/14 |
| 5,725,633 A | 3/1998 | Ozcayir et al. | 95/45 |
| 6,245,881 B1 | 6/2001 | Faure et al. | 528/353 |
| 6,376,129 B2 | * 4/2002 | Faure et al. | 429/306 |
| 6,425,944 B2 | * 7/2002 | Faure et al. | 96/14 |

FOREIGN PATENT DOCUMENTS

| | | | |
|---|---|---|---|
| EP | 0811421 | 12/1997 | |
| EP | WO97/49745 | 12/1997 | C08G/18/08 |
| EP | WO97/49747 | 12/1997 | C08G/18/72 |
| FR | 2.050.251 | 4/1971 | |
| WO | WO 97/42253 | 11/1997 | |

* cited by examiner

SEPARATION METHOD AND DEVICE WITH SEMI-PERMEABLE MEMBRANES COMPRISING SULPHONATED POLYIMIDES

DESCRIPTION

The invention relates to a semi-permeable membrane separation process and device in which the said membranes comprise sulphonated polyimides.

The present invention also relates to the use of sulphonated polyimide membranes in separation processes and devices using semi-permeable membranes.

In a general manner, the technical field of the invention can be described as that of industrial processes, in particular separation processes using semi-permeable membranes.

The first characteristic of the membranes used in these processes is that they favour the movement of certain species. The membrane is therefore considered to have a certain selectivity which, associated with the permeation flow, allows the performance of the membranes to be defined.

Amongst semi-permeable membranes, ion exchange membranes or ionic membranes are very widespread and very widely used.

They are used, in particular, in processes that use an electrical field to favour the transfer and the separation of different species of ion, such as electro-dialysis, electro-osmosis or in electrochemical cells used in the treatment of various effluents, in this latter case, the membranes then act as separators between the anodic and cathodic compartments.

Two types of ion exchange membranes are mainly distinguished:
- anionic membranes, which are only permeable to anions and whose functional group is, for example, a quaternary ammonium group.
- cationic membranes, which are only permeable to cations and whose functional group is, for example, an acid group.

The properties of the membranes, which determine the general properties of the processes and the devices which are used in them, are mainly permselectivity, selectivity, ionic conductivity, electrical resistance and mechanical strength.

Permselectivity, or the cation—anion transfer restriction factor, is one of the fundamental properties of an ion exchange membrane. It is characterised by the value of the transfer number of the mobile ion or counter ion (in other words, the ion which should normally pass through the membrane; in the case of a cationic membrane, the counter ion is thus the cation) in the membrane.

By definition, the transference number for a perfectly permselective membrane is equal to one. In fact, it is more accurate to measure the increase in the transference number value in the membrane compared to its value in solution. The permselectivity of a membrane is therefore actually defined by:

$$Ps = \frac{\bar{t} - t}{1 - t}$$

where $\bar{t}$ is the transference number of the counter ion in the membrane and $t$ is the transference number of the said ion in the solution.

The permselectivity of a membrane must be as high as possible; the permselectivity of most membranes is generally greater than 80%.

Selectivity is defined in a more or less analogous manner, as being the transference restriction factor between two ions with the same polarity. This selectivity must also, preferably, be as high as possible.

The ionic conductivity of the membrane, expressed by $\sigma$ in $S.cm^{-1}$, must be as high as possible and depends, amongst other things, on the structure of the membrane (swelling, concentration in groups of exchangers and physical structure).

The electrical resistance of the membrane must be as low as possible, in such a way that it does not lead to too high consumption of energy; the electrical resistance is, for a given conductivity, proportional to the thickness of the membrane.

The mechanical strength of the membrane must also be high in order to resist any pressure differences and stresses that may occur during the manufacture of the devices.

Other important properties are the temperature resistance, which must be as high as possible, in order to make it possible to treat media at high temperature, and the resistance to extremes of pH, in other words, very basic or very acidic and/or very oxidising media.

In the conditions of use corresponding to extremely acidic pHs or in very oxidising media, the operational life of the membranes can be very limited.

It has been observed that the membranes presently available for semi-permeable separation processes or devices do not meet all of the criteria and requirements mentioned above while, at the same time, being at an acceptable cost. In particular, membranes that can operate in extreme pH media, for example, very acidic and/or very oxidising media, are certainly known, but they do not meet one or all of the other criteria defined above and they are very expensive.

The document FR-A-2 050 251 describes sulphonated polyimides and their use as cationic membranes in electro-dialysis. However, these polymers, due the process used for their preparation, are completely statistical polymers with a random structure whose properties, such as conductivity, are completely uncontrolled and difficult to master. As a result, these polymers are unsuitable for applications in any separation process and do not meet, in fact, any of the criteria defined above.

There is therefore a need for a semi-permeable membrane separation process and device in which the said membranes meet all of the criteria mentioned above and which have improved performance compared to existing membranes.

Furthermore, there is also a need for a process and a device whose membranes are not expensive to manufacture and whose resistance in extremely acidic pH media and/or very oxidising media is excellent.

The aim of the invention is to provide a semi-permeable membrane separation process and device in which the membranes meet the requirements mentioned above, and which do not have the demerits, disadvantages, defects or limitations of the processes and devices of the prior art and which overcome the problems of the prior art.

This aim and others are achieved according to the invention by a semi-permeable membrane separation process in which the said membrane(s) comprise a sulphonated polyimide that has the following general formula (I):

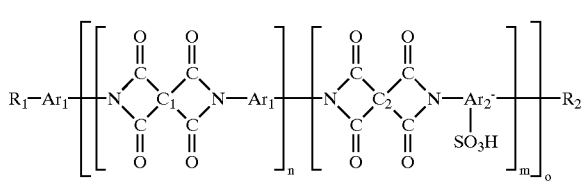

(I)

In which the groups $C_1$ and $C_2$ may be identical or different, and each represent a tetravalent group comprising at lease one aromatic carbon ring, which may be substituted, having 6 to 10 carbon atoms and/or a heterocyclic ring with an aromatic character, which may be substituted, having 5 to 10 atoms and comprising one or several heteroatoms chosen from the group S, N and O: $C_1$ and $C_2$ each form, with the neighbouring imide groups, rings with 5 or 6 atoms.

The groups $Ar_1$ and $Ar_2$ may be identical or different, and each represent a divalent group comprising at least one aromatic carbon ring, which may be substituted, having 6 to 10 carbon atoms and/or a heterocyclic ring with an aromatic character, which may be substituted, having 5 to 10 atoms and comprising one or several heteroatoms chosen from the group S, N and O: at least one of the said aromatic carbon and/or heterocyclic rings of $Ar_2$ being, in addition, substituted with at least one sulphonic acid group. In the formula (I), each of the groups $R_1$ and $R_2$ represent $NH_3$, or a group with the formula:

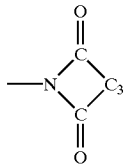

Where $C_3$ is a divalent group comprising at least one aromatic carbon ring, which may be substituted, having 6 to 10 carbon atoms and/or a heterocyclic ring with an aromatic character, which may be substituted, having 5 to 10 atoms and comprising one or several heteroatoms from the group S, N and O; $C_3$ forming, with the neighbouring imide group, a 5 or 6 atom ring.

In addition, in the formula (I) above:
m represents a whole number, preferably between 2 and 20, and even more preferably, between 2 and 10
n represents a whole number, preferably between 2 and 30, and even more preferably, between 2 and 20
o represents a whole number, preferably between 2 and 10, and even more preferably, between 2 and 6.

The copolymer used in the process according to the invention may be defined as being a sequenced or block copolymer comprising two types of structures.

The molecular weight of the polyimide according to the invention is generally between 10 000 and 100 000, and preferably between 20 000 and 80 000.

The equivalent molecular weight of the polyimide according to the invention is preferably between 400 and 2 500 and, even more preferably, between 500 and 1 200.

The equivalent molecular weight is defined as the weight of the polymer in grams per acid equivalent.

As a result, the numbers m and n will be selected in such a way so that the equivalent molecular weight is between 400 and 2 500, and even more preferably between 500 and 1 200.

In a general manner, it is known that heterocyclic polymers and, in particular, polyimides, allow films to be formed, thanks to their synthesis in two stages.

These "heterocyclic" polymers are used, for example, in aeronautic and space applications, which require excellent mechanical properties and good oxidation resistance. These applications are very far from the scope of the present application.

The specific sulphonic copolyimides of the present invention are described, in part, in document FR-A-2 748 485.

This document indicates that these polymers have the properties required for making membranes and, in particular, cation exchange membranes, specifically designed for fuel cells, and their performance characteristics are essentially compatible with applications in fuel cells.

In particular, these copolymers can be easily formed into films or membranes with an adequate thickness.

These copolymers have a very high ion exchange capacity, greater than 0.4 meq/g, for example, from 0.8 to 2.5 meq/g.

Membranes made out of these polymers also have very good thermal stability and particularly high temperature acid hydrolysis resistance, in other words, the most stable membranes can go up to a temperature of, for example, 100 ° C. and moreover, for long periods, for example, 3 000 hours.

These conditions are application conditions that can arise in fuel cells where the membranes, described in this document, are mainly used.

In the same way, the membranes described in this document have excellent resistance to reduction and oxidation.

The membranes comprising the sulphonated polyimides, described above, have therefore been developed with the specific purpose of their being used in fuel cells and their mechanical, physical, chemical and electrical properties are thus specific to this limited application field.

However, it has been shown that membranes comprising certain sulphonated polyimides, cited above in the document FR-A-2 748 485, also posses, in a totally unexpected manner, particularly excellent selectivity and permselectivity properties, which make them, in a 15 surprising manner, particularly suitable for use in semi-permeable membrane separation processes. These are sequenced polymers with the formula (I).

In a general manner, the permselectivity Ps of the membrane according to the invention is between 90 and 100 %, without this range being limiting; in fact, Ps depends on the electrolytic concentration and, for example, if a Ps of 75 % can be considered as poor for concentrations of 1 M, it is excellent for a concentration of 4 M.

Also in a general manner, the selectivity $H^+/M^{Z+}$, where Z is generally a whole number between 1 and 6 (Z=1, 2, 3, 4, 5, 6), is between 0.70 and 0.95, without this range being limiting; in fact, as for Ps, the selectivity depends, for example, on the nature of the cation associated with the proton, the ratio $H^+/M^{z+}$, and certainly the total concentration of cations.

For example, the membranes according to the invention have a permselectivity Ps of between 100 and 95 % in aqueous hydrochloric acid solutions with respective concentrations of 0.1 molar and 1 molar.

Moreover, the membranes according to the invention have, for example, a selectivity, measured by the transference number of the proton under a current equal to 0.76, 0.80 and 0.91, for the cation pairs $H^+/Na^+$, $H^+/Cu^{2+}$, and $H^+/Cr^{3+}$, in equimolar $H^++M^{z+}$ aqueous solutions with a total cation concentration equal to 0.1 mole concentration per liter and under an applied current density of 100 A per $m^2$.

These permselectivity and selectivity properties are not described in the document FR-A-2 748 485 and can absolutely not be inferred from this document, which exclusively concerns the application of these membranes in fuel cells, in which such properties are not at all sought.

Furthermore, in a particularly advantageous manner, one can easily vary and adapt the selectivity and/or permselectivity properties of the sulphonated polyimides of the membranes used in the invention process by modifications to the synthesis of the sulphonated polyimide by changing, for example, the nature of the dianhydrides and the diamines, the concentration of the sulphonic groups, the concentration of these groups, etc.

In this way it will be possible to very easily adapt the selectivity and permselectivity of the polyimide as a function of the desired specific application.

The permselectivity and selectivity values cited above are, in a surprising manner, considerably improved compared to other values shown by semi-permeable membranes used in the prior art, such as Nafion® membranes.

The semi-permeable membrane separation process according to the invention, in which the said membrane(s) comprise a sulphonated polyimide with the formula (I) above, have, on the one hand, all of the advantages linked to the new properties of selectivity and permselectivity of these membranes and, on the other hand, all of the advantages linked to the properties of these membranes, already mentioned above and, in particular, good conductivity and excellent behaviour in acidic media.

It is, moreover, extremely important to note that, amongst the polymers described in the document FR-A-2 748 485, which can also be statistical sequenced polymers (namely with n and m equal to 1), only ordered sequenced ("block") polymers, described by the formula (I) above have been retained for use in the semi-permeable membrane separation process of the invention. This specific chemical structure of the formula (I) allows, also, a specific physical structure (a "block" structure) of the semi-permeable membrane, which is fundamentally the basis of the surprising and advantageous properties of these membranes, to be obtained, which makes them particularly suited to a semi-permeable membrane separation process. These surprising properties cannot, in any case, be shown by statistical polymers, such as those described in the document FR-A-2 050 251, Thus, the structure of the polymers of formula (I) with, in particular, a perfectly defined distribution of the sulphonic groups in the different sequences, right along the polymer chain, is especially the reason for the excellent and better conductivity of the membranes specifically used in the invention, which leads, in particular, to a better yield when they are used in the separation process according to the invention.

In the statistical, random polymers of the document FR-A-2 050 251, the distribution of the sulphonic groups in the polymer is completely random and anarchic, and as a result the conductivity is mediocre and uncontrollable. The specific chemical structure of sequenced, ordered polymers with the formula (I) induces a physical structure that gives better resistance to chemical attack and/or electrochemical attack and better ageing resistance in the operating conditions of the membranes, which are those of the separation process according to the invention. Once again, such a physical structure cannot be obtained with the statistical polymers of document FR-A-2 050 251, which have a poorly defined structure.

The process according to the invention thus provides a solution to the problems that are posed in semi-permeable processes according to the prior art using other membranes, due to the fact that the semi-permeable membranes used in the process according to the invention meet, simultaneously, all of the criteria defined previously and have, moreover, improved permselectivity and selectivity compared to membranes of the prior art. As a result, the process according to the invention has better efficiency and provides a considerable saving in energy compared to the prior art.

In a particularly advantageous manner, it turns out that the process according to the invention may be carried out with extremely acidic pH media and/or very oxidising media, without the operational life of the membranes being reduced in a prohibitive manner.

The process according to the invention, carried out with such media, is low cost, linked to the low cost of the specific membranes used according to the invention. In fact, the production cost of these membranes is—at identical, or even superior, performance—considerably lower than that of existing semi-permeable membranes, which operate in extreme pH and/or very oxidising media.

In fact, the polyimides that are used in the manufacture of the membranes used according to the invention are prepared in a simple manner using proven industrial methods and from raw materials that are available and not expensive.

In the formula (I) cited above, $C_1$ and $C_2$ may be identical or different and each represent, for example, a benzene ring, which may be substituted by one or two substituents chosen from alkyl and alkoxy groups with 1 to 10 C and halogen atoms; or several benzene rings which may be substituted by one or several subsituents chosen from alkyl and alkoxy groups with 1 to 10 C atoms and halogen atoms, for example between 2 and 4 rings, linked to each other by a single bond or by a divalent group.

The said divalent group is chosen, for example, from:

a divalent group derived from a linear or branched alkyl group (for example, an alkylidene or alkylene group) with 1 to 10 C atoms, which may be substituted, preferably on the same carbon atom, by one or several halogens chosen from F, Cl, Br and I and/or by one or several hydroxyl groups and, even more preferably, the said divalent group is a divalent group derived from a perfluorated alkyl group, for example, perfluorated alkylene.

a heteroatom chosen from O, S a group

a group

a group

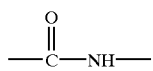

a group

a group

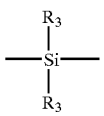

a group

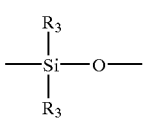

where $R_3$ is chosen from alkyl groups with 1 to 10 C atoms such as methyl, ethyl, isopropyl, etc.

$C_1$ and $C_2$ may also each represent a condensed polycyclic carbon group, which may be substituted by one or several substituents chosen from the alkyl and alkoxy groups with 1 to 10 C atoms and halogen atoms, comprising, for example, from 2 to 5 benzene rings, chosen, for example, from naphthalene, phenanthrene, coronene, perylene, etc.

$C_1$ and $C_2$ may also each represent a heterocycle or a condensed heterocycle, with an aromatic character, such as thiophene, pyrazine, pyridine, furan, quinolene, quinoxaline, isobenzofuran; this heterocycle, which may be substituted by one or several substituents chosen from the alkyl groups (for example, methyl, ethyl, isopropyl, etc.) and alkoxy groups with 1 to 10 C atoms, and the halogen atoms (F, Cl, Br, I).

Amongst the polyimides that may be used within the scope of the invention, one can cite those in which $C_1$ is a benzene ring and $C_2$ a set of two benzene rings linked to each other by an oxygen bridge; or $C_1$ comprises benzene rings, and even more preferably, two benzene rings linked to each other by one or several perfluoroalkylene groups and $C_2$ comprises benzene rings and, even more preferably, two benzene rings linked to each other by one or several divalent perfluoroalkyl or perfluoroalkylene groups; or $C_1$ is a benzene ring and $C_2$ a naphthenic ring; or $C_1$ and $C_2$ are both naphthalene rings.

$Ar_1$ and $Ar_2$ may be identical or different and each represent, for example, a divalent benzene ring with meta or para links; which may be substituted by one or several subsituents chosen from the alkyl and alkoxy groups with from 1 to 10 C atoms such as methyl, ethyl, isopropyl, butyl, methoxy, etc., and halogen atoms; or several benzene rings, which may be substituted by one or several chosen from the alkyl and alkoxy groups with from 1 to 10 C atoms and the halogen atoms, for example, with 2 to 5 rings, linked to each other by a single bond or by a divalent group. The said divalent group is chosen, for example, from:

a heteroatom, chosen from O, S a group

a group

a group

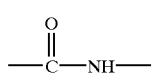

a group

a group

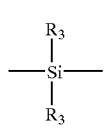

a group

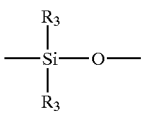

where $R_3$ is chosen from alkyl groups with 1 to 10 C atoms such as methyl, ethyl, isopropyl, etc.

$Ar_1$ and $Ar_2$ may also each represent a condensed polycyclic carbon group, which may be substituted by one or several substituents chosen from the alkyl and alkoxy groups with 1 to 10 C atoms and the halogen atoms, comprising, for example, 2 to 5 benzene rings, chosen, for example, from naphthalene, phenanthrene, coronene, perylene, etc.

$Ar_1$ and $Ar_2$ may also represent, for example, a heterocycle or a condensed heterocycle with an aromatic character, for example thiophene, pyrazine, pyridine, furan, quinolene, quinoxaline, isobenzofuran, and this heterocycle may be substituted by one or several substituents chosen from the alkyl and alkoxy groups with 1 to 10 C atoms, for example, methyl, ethyl, isopropyl, methoxy, and the halogen atoms (F, Cl, Br, I).

According to the invention, at least one of the cycles of $Ar_2$, for example benzene or polyphenyl or others, is substituted, in addition, by one or several sulphonic acid groups.

The preferred polymers are those in which $Ar_1$ is a diphenylmethane group and $Ar_2$ is a biphenyl-disulphonic group; or $Ar_1$ is a benzene group and $Ar_2$ is a biphenyl-disulphonic group; or $Ar_1$ is a diphenylether group and $Ar_2$ is a biphenyl-disulphonic group.

$C_3$ is, for example, a benzene or naphthalene ring, which may be substituted by one or several substituents chosen from the alkyl and alkoxy groups with 1 to 10 C atoms and the halogen atoms.
Examples of $C_1$ and $C_2$ groups are as follows:
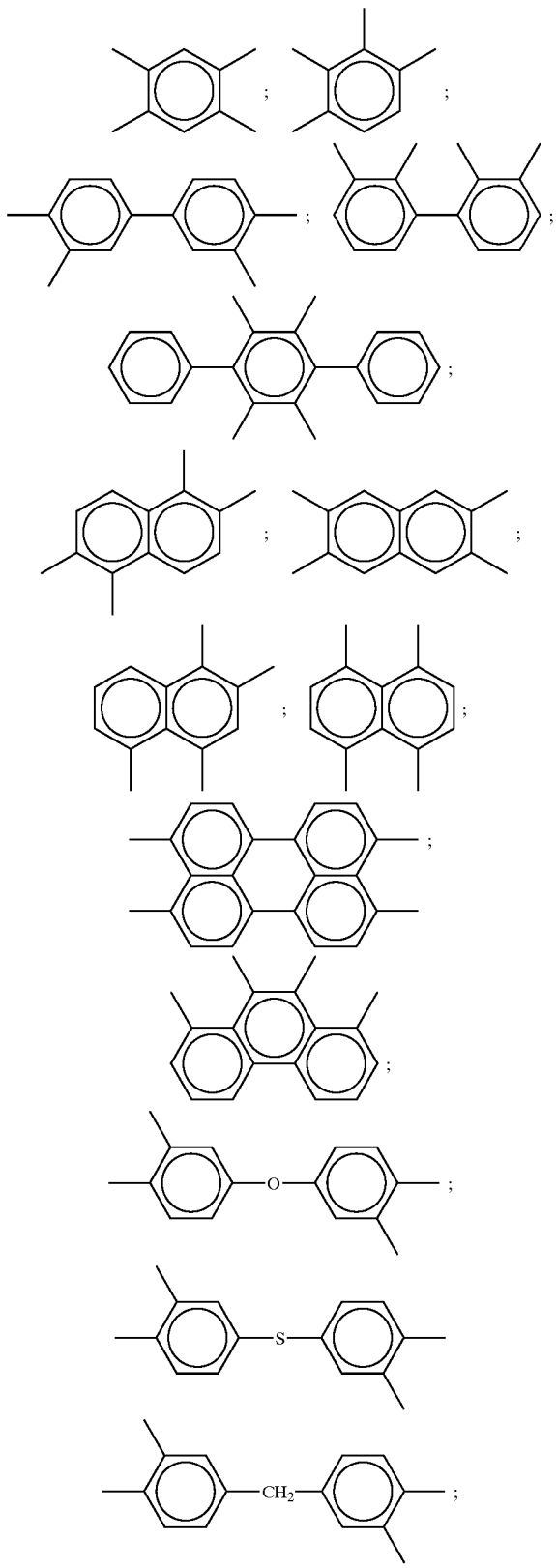
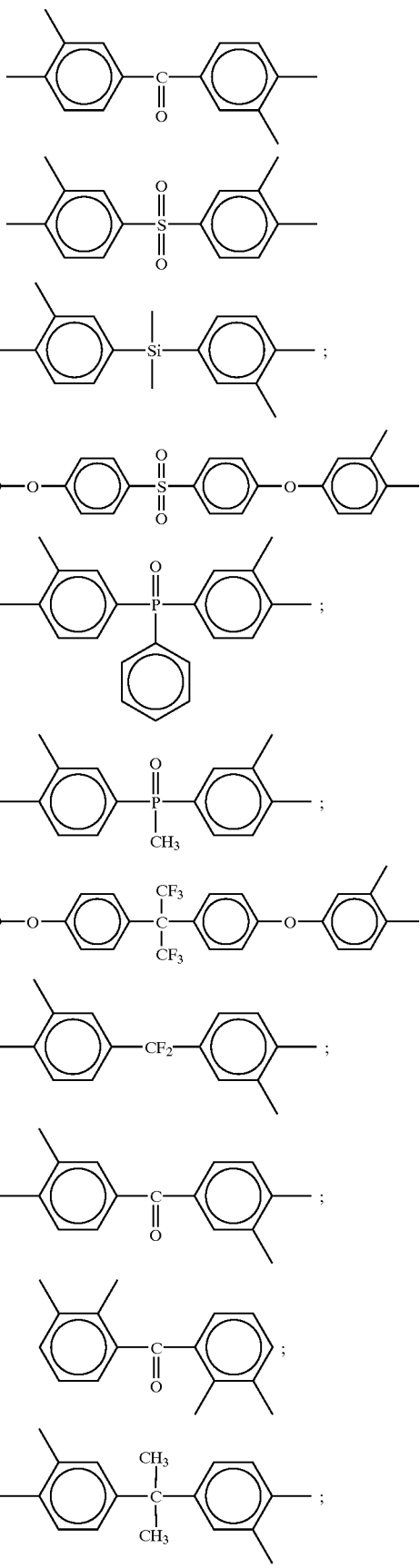

-continued
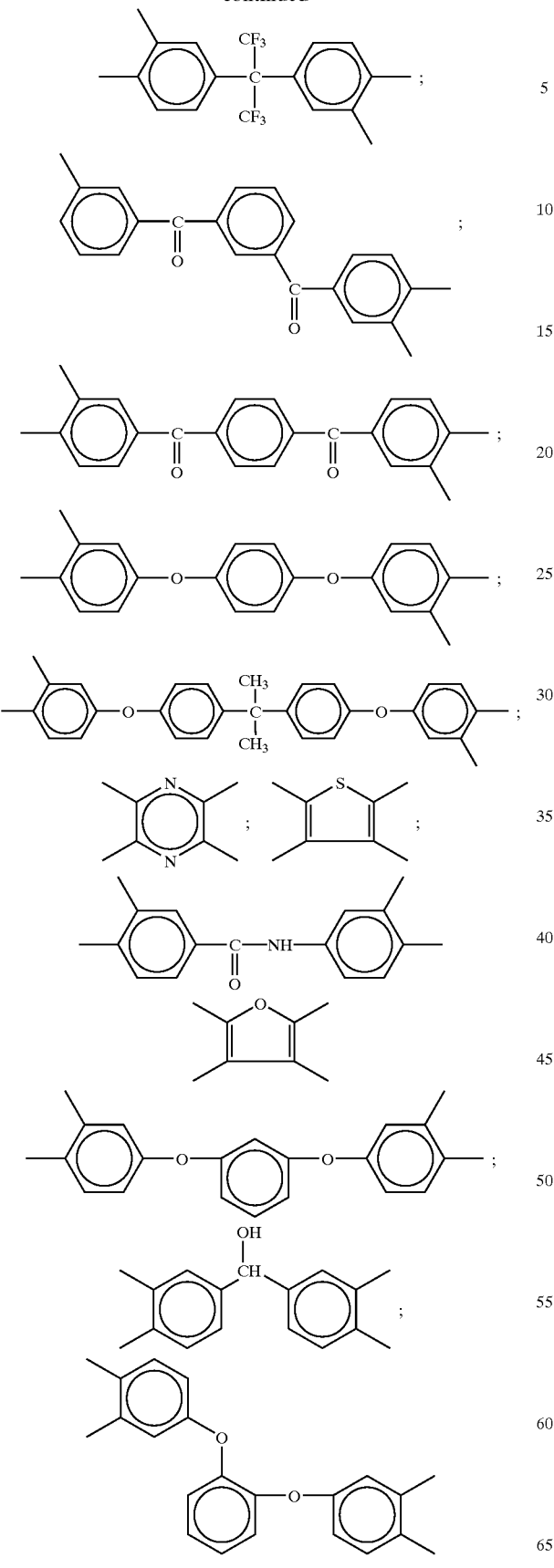
Examples of $Ar_1$ groups are as follows:
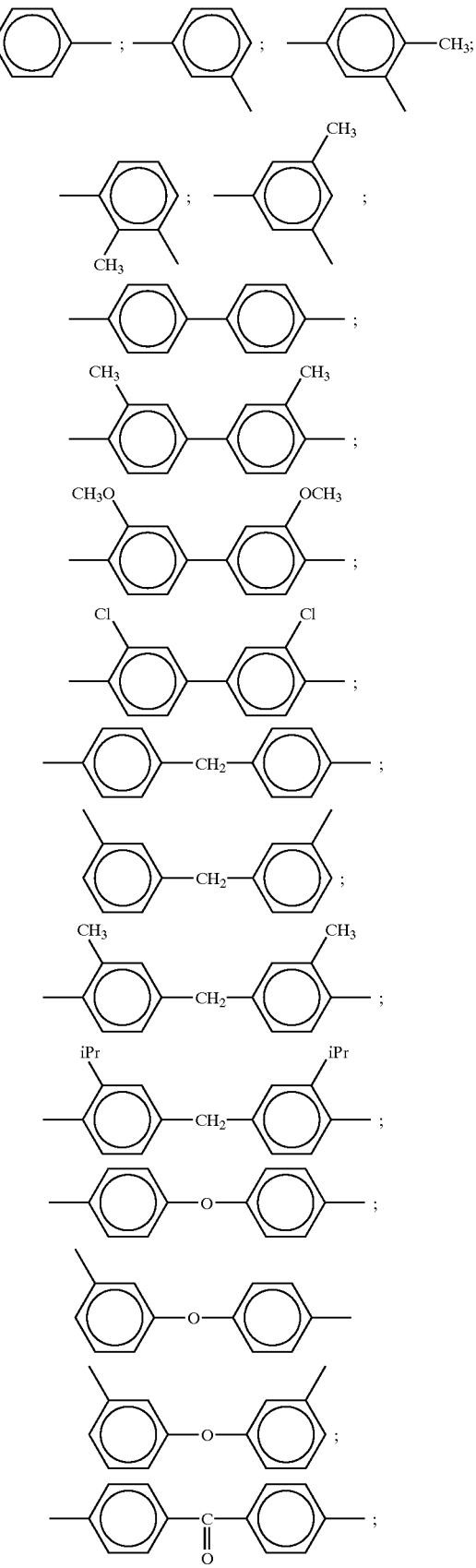

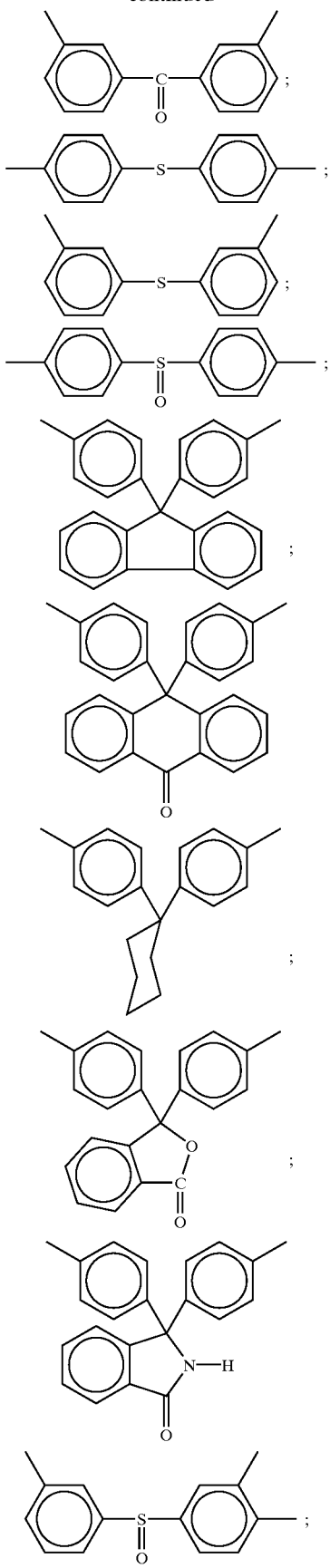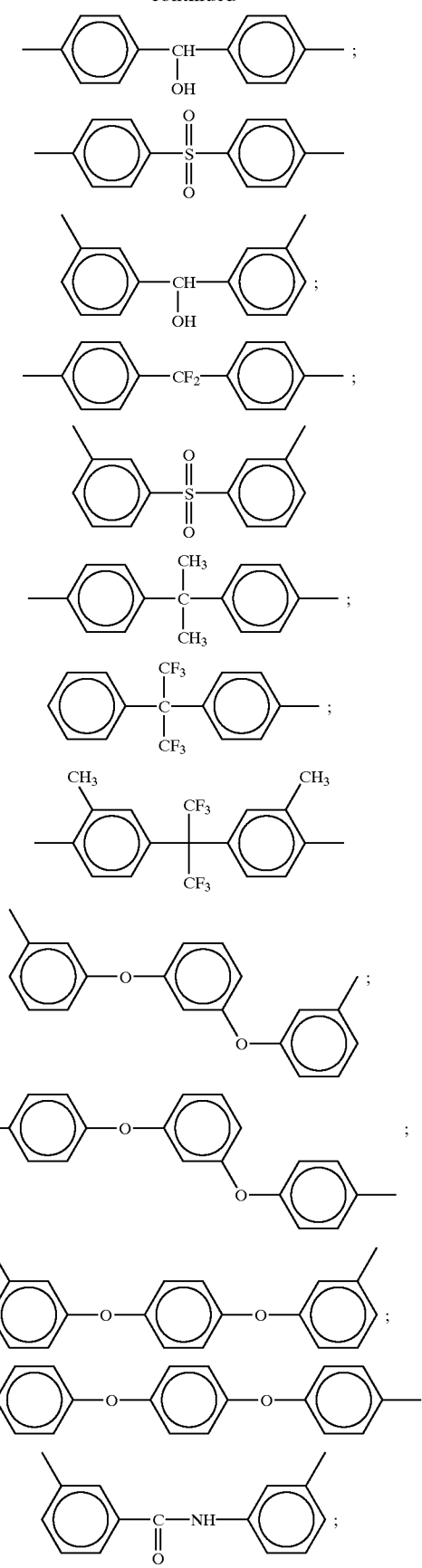

-continued

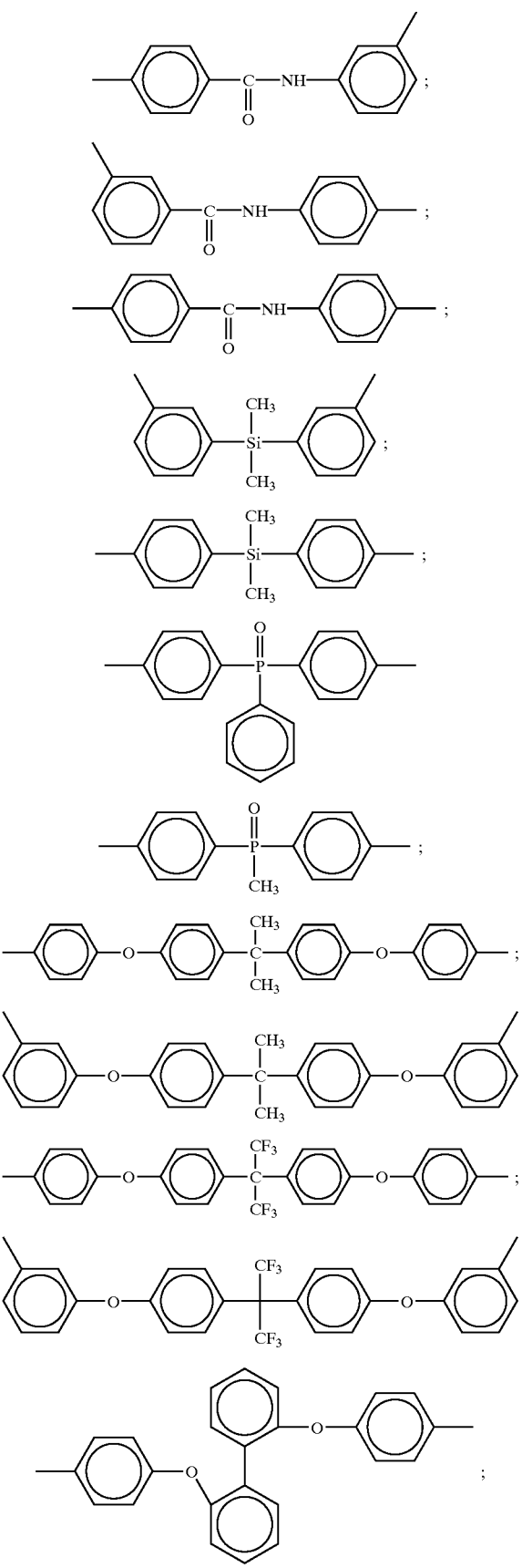

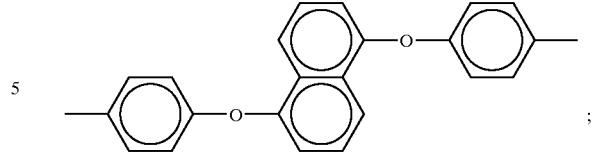

Examples of Ar$_2$ groups are as follows:

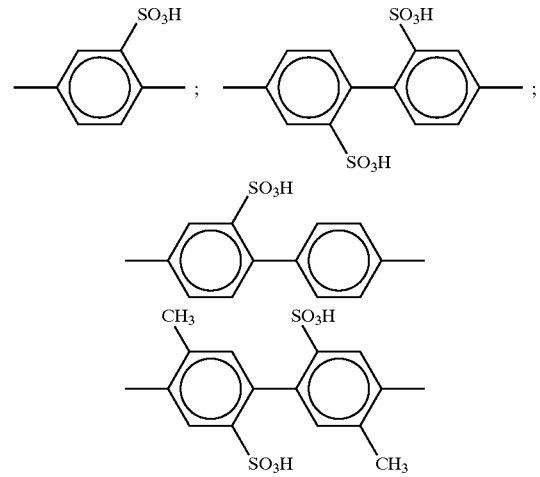

Amongst the Ar$_2$ groups, one can also site any of the Ar$_1$ groups cited above bearing, in addition, one or several SO$_3$H group(s) on its or their ring(s) and/or heterocycle(s).

Examples of C$_3$ groups are as follows:

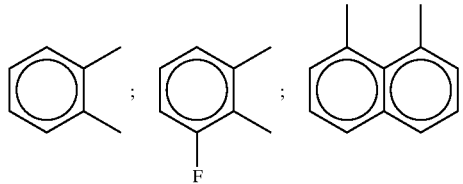

The polyimides used in the process and the device according to the invention may be obtained by any process known to those skilled in the art for the preparation of polyimides in general.

Examples of known processes for the preparation of polyimides are, notably, as follows:
reaction of a dianhydride with a diamine
reaction of a diacid diester with a diamine It is obvious that the polyimides according to the invention can be prepared by processes deriving from the processes cited above.

Any necessary process adaptations and optimisations known and described in the literature can be easily made by those skilled in the art.

Preferably, one uses to prepare the polyimides according to the invention, the condensation of dianhydrides with diamines via a two stage synthesis.

This type of process if completely different to the preparation process described, for example, in the document FR-A-2 050 251, in which the polymerisation is carried out in the polyamide form and a subsequent thermal treatment allows the cyclisation reaction to take place in order to obtain heterocyclic polyimide structures from polyamic acids. On the contrary, in the preparation process used preferably in the present application, the polymerisation involves a polycondensation reaction between dianhydrides, for example, naphthalenic dianhydrides and diamines. The imide structures therefore exist beforehand and no subsequent treatment is necessary.

This fundamental difference between the synthetic approach used to prepare the polyimides according to the invention and that in document FR-A-2 050 251 has a consequent effect on the structure of the polyimides obtained and, in particular, on the distribution of the sulphonic groups along the polymer chains: this distribution is statistical and random when the process described in the document FR-A-2 050 251 is used, while it is totally modulable between statistical and—specifically for polymers with formula (I)— blocks or sequences of different lengths, thanks to the two stage synthesis process used according to the invention.

It is precisely the specific, ordered and sequenced chemical structure of the polymers of formula (I) that confers them with, as indicated previously, the advantageous properties profitably highlighted in the separation process according to the invention.

The two stage synthesis process is widely used in industry and only requires slight adaptations to allow the polyimides according to the invention to be prepared.

The synthesis of a condensation polyimide thus generally conforms to the following two stage diagram:

In the first stage, the condensation reaction of a dianhydride and a diamine is carried out in order to obtain an intermediate polyamide—acid with the formula (VI), termed "prepolymer", according to the diagram below, given for the first type of recurrent polyimide structure according to the invention:

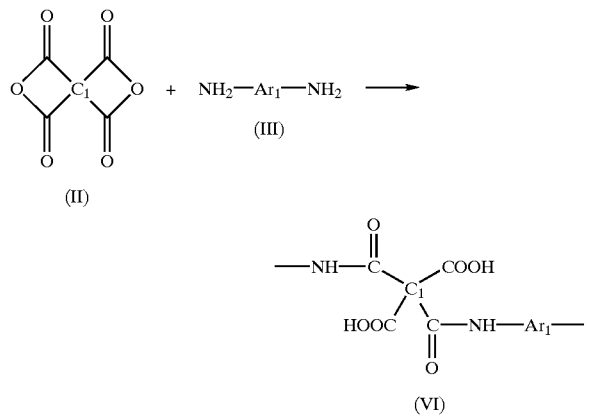

or according to the diagram below for the second type of recurrent polyimide structure according to the invention:

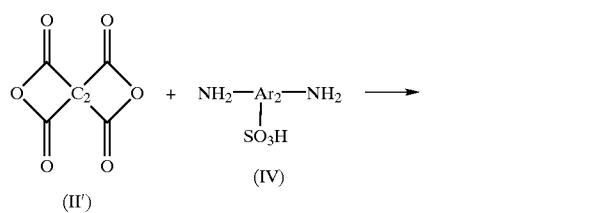

-continued

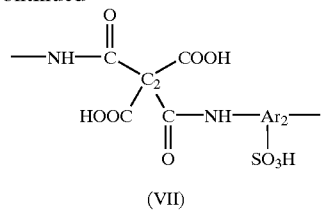

The initial reaction products, whether they are the dianhydrides (II) (II') or the bi-primary diamines (III) (IV) are products that are easily obtainable and, for the most part, not very expensive.

As a result, and in compliance with one of the particularly interesting characteristics of the present application, the polymers prepared, and as a result, the membranes obtained from these polymers, have a relatively low cost; around, for example, one tenth of the cost of membranes prepared according to the previous art, which are presently used in semi-permeable membrane devices and processes.

One can thus envisage, a consequent reduction in the cost price of these devices.

Amongst the dianhydrides with a general formula (II):

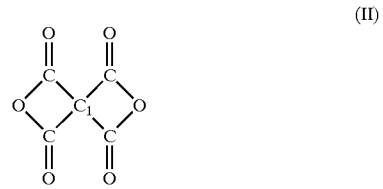

Where $C_1$ has the signification already given above.

One can cite, as an example, the dianhydrides of the following aromatic tetracarboxylic acids: benzene-1,2, 3,4-tetracarboxylic acid; benzene-1,2,4,5-tetracarboxylic acid; 1,1'-biphenyl-2,3',5',6'-tetracarboxylic acid; 1,1'-biphenyl-3, 3',4,4'-tetracarboxylic acid; 1,1'-biphenyl-2,2',3,3'-tetracarboxylic acid; 1,1',1"-terphenyl-2',3', 5',6'-tetracarboxylic acid; naphthalene-1,2,5,6-tetracarboxylic acid; naphthalene-2,3,6,7-tetracarboxylic acid; naphthalene-1,2,4,5-tetracarboxylic acid; naphthalene-1,4,5,8-tetracarboxylic acid; perylene-3,4,9,10-tetracarboxylic acid; phenanthrene-1,8,9,10-tetracarboxylic acid; 4,4'-oxybis-(benzene-1,2-dicarboxylic acid); 4,4'-thiobis-(benzene-1,2-dicarboxylic acid); 4,4'-sulphonylbis-(benzene-1,2-dicarboxylic acid); 4,4'-methylenebis-(1,2-dicarboxylic acid); 4,4'-difluoromethylene-bis-(benzene-1,2-dicarboxylic acid); 3,3'-carbonylbis-(benzene-1,2-dicarboxylic acid); 4,4'-carbonylbis-(benzene-1,2-dicarboxylic acid); 4,4'-methyl-1-ethylidene-1,1'-bis-(benzene-1,2-dicarboxylic acid); 4,4'-trifluoromethyl-1-trifluoro-2,2,2-ethylidene-1,1-bis-(benzene-1,2-dicarboxylic acid); 4,4'-phenylene-1,3-bis (carbonylbenzene-1,2-dicarboxylic acid); 4,4'-phenylene-1, 4-bis(carbonylbenzene-1,2-dicarboxylic acid); 4,4'-phenylene-1,3-bis-(oxybenzene-1,2-dicarboxylic acid); 4,4'-phenylene-1,4-bis-(oxybenzene-1,2-dicarboxylic acid): 4,4'-methyl-1-ethylidene-1,1bis-(phenyl-1,4-oxy)-bis-(benzene-1,2-dicarboxylic acid); pyrazine-2,3,5,6-tetracarboxylic acid; thiophene-2,3,4,5-tetracarboxylic acid and 3,3',4, 4'tetracarboxy-benzanilide.

The dianhydrides of the general formula (II'):

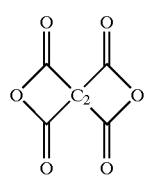

(II')

where $C_2$ has the signification already given above and may be chosen from the same compounds cited above for the dianhydrides of formula (II).

Amongst the biprimary diamines of formula (III) $H_2N$—$Ar_1$—$NH_2$ where $Ar_1$ has the signification already given above and which may be used in the preparation of the polyimides according to the invention, one may cite, for example: 1,3-benzene diamine; 1,4-benzene diamine; 6-methyl-1,3-benzene diamine; 2-methyl-1,3-benzene diamine; 5-methyl-1,3-benzene diamine; 4,4'-diamino-1,1'-biphenyl; 4,4'-diamino-3,3'-dimethyl-1,1'-biphenyl; 4,4'diamino-3,3'-dimethoxy-1,1'biphenyl; 4,4'-diamino-3,3'-dichloro-1,1'biphenyl; 4,4'-methylenebis-(benzene amine); 3,3'-methylenebis-(benzene amine); 4,4'-methylenebis-(methyl-3,3'-benzene diamine); 4,4'-methylene-bis (isopropyl-3-benzene amine); 4,4'-oxybis (benzene amine); 3,3'-oxybis-(benzene amine); 4,4'-carbonylbis-(benzeneamine); 3,3'-carbonylbis-(benzene amine); 4,4'-thiobis-(benzene amine); 3,3'-thiobis-(benzene amine); 4,4'-sulphonylbis-(benzene amine); 3,3'-sulphonylbis-(benzene amine); 4,4'-hydroxymethylenebis-(benzene amine); 3,3'-hydroxymethylenebis-(benzene amine); 4,4'-difluoro-methylenebis-(benzene amine); 4,4'-methyl-1-ethylidenebis-(benzene amine); 4,4'-trifluoro-methyl-1-trifluoro-2,2,2-ethylidenebis-(benzene amine); 3,3'-phenylene-1,3-dioxybis-(benzene amine); 4,4'-phenylene-1,3-dioxybis-(benzene amine); 3,3'-phenylene-1,4-dioxybis-(benzene amine); 4,4'-phenylene-1,4-dioxybis-(benzene amine); 3,3'-diamino-benzanilide; 3,4-diamino-benzanilide; 4,4'-diamino-benzanilide; bis (amino-3-phenyl)-dimethylsilane; bis-(amino-4-phenyl)-dimethylsilane and 9-fluoro-ylidene-bisphenyl-amine.

Amongst the biprimary sulphonated diamines with formula (IV):

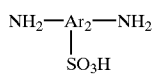

(IV)

Where $Ar_2$ has the signification already given above, and that one can use, within the scope of the preparation of polyamides according to the invention. One can cite, for example, 1,4-diaminobenzene-3-sulphonic acid, and 4,4'-diamino-1,1'-biphenyl-di-2,2' sulphonic acid.

The condensation of dianhydrides with diamines can be carried out, within the scope of the invention, either with or without a chain limiting agent.

However, it is preferable to use a chain limiting agent, preferably an anhydride type, since by doing this one avoids the presence at the end of the polymer chain of an easily oxidisable amine group.

Amongst the anhydride type chain limiting agents that are suitable for preparing the polymers according to the invention, one can cite the functional anhydrides with the following formula (V):

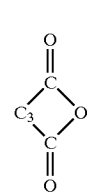

(V)

where $C_3$ has the signification already given above.

Examples of anhydrides with formula (V) are phthalic anhydrides and 3-fluorophthalic anhydride, naphthalene-1,8-dicarboxylic anhydride, etc.

In a second stage, the actual synthesis of the polyimide is carried out according to the following diagram given as an example of the first type of recurrent structure:

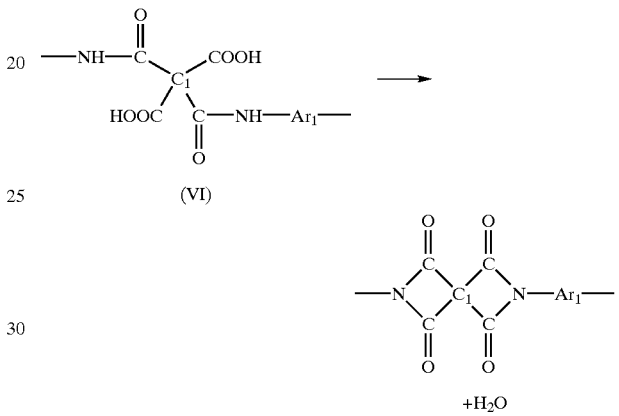

(VI)

+$H_2O$

In the first stage of the preparation process for the polyimides according to the invention, one can dissolve the basic reagents in an appropriate solvent.

The solvent may be any appropriate solvent known by those skilled in the art as suitable for polycondensation reactions of dianhydrides with diamines.

In a preferred embodiment of the invention, the solvent is an aprotic polar solvent chosen, for example, from dimethylformamide, dimethylacetamide, N-methylpyrrolidone, either singly or as mixtures with, for example, aromatic solvents such as xylene or glycol ether type solvents.

The solvent may also be a phenolic type solvent, in other words, chosen, for example, from phenol, phenols substituted by one or several halogens (Cl, I, Br, F), creosols (o-, m- and p-cresol), cresols substituted by one or several halogens (Cl, I, Br, F), and mixtures of these solvents.

The preferred solvents are those comprising m-cresol and a mixture of para-chloro-phenol or meta-chloro-phenol and phenol, for example in the proportions of 20% phenol and 80% para- or meta-chloro-phenol.

Reagents are taken to mean compounds (II), (III), (II') (IV) and possibly (V), already described above. One may, for example, begin by reacting, as initial reagents present in the mixture, a dianhydride (II) and/or a dianhydride (II') with a sulphonated diamine (IV), then adding the second diamine (III).

All of the possible combinations concerning the order of addition of the reagents may easily be determined by those skilled in the art.

The first stage condensation reaction is carried out in solvent, generally at ordinary temperature, for example 20–25° C., and it forms the intermediate polyamide-acid, or prepolymer.

The intermediate polyamide-acid obtained may be used, for example, to prepare a film, for example, by casting; the solvent is then evaporated at a temperature of 50 to 150° C. in order to give a final polyamide acid, and the polyimide according to the invention is obtained in accordance with the second stage, either by thermal treatment at a temperature below 250° C. (in other words, below the desulphonation temperature), or by chemical dehydration by using acetic anhydride.

Another preferred alternative consists in heating the initial solution containing, in the first instance, all of the reagents, to a temperature of, for example, 120 to 200° C. for, for example, 6 to 72 hours.

The initial solution may, as has already been mentioned above, only contain in a second case, part of the reagents required for the preparation of the final polyimide, for example the initial mixture may only contain compounds (II) and/or (II'), and (IV). In this case, the mixture is heated to a temperature of, for example, 120 to 200° C. for, for example, 6 to 72 hours, then the mixture is allowed to cool to a temperature of, for example, 20 to 50° C. and then the remainder of the reagents, for example compounds (III) and (II), are added.

The temperature of the mixture is then raised to, for example, 120 to 200° C. for, for example, 6 to 72 hours.

In both cases, the heating causes the cyclisation of the amide acid into the imide and one obtains the polyimide, according to the invention, as the final product.

The polymerisation is stopped by cooling the solution, for example, to ambient temperature. The solution is then poured, preferably slowly, for example under very vigorous agitation, into a recipient containing, for example, methanol or ethanol.

The normally fibrous solid that precipitates is separated, for example, by filtration and is then preferably washed once or several times, for example with a sufficient quantity of, for example, methanol.

The polymer obtained is then dried, preferably at a temperature between 50 and 120° C., for example, in a forced air oven for sufficient time.

The films or membranes comprising the sulphonated polyimide described above can be prepared by conventional methods, for example by casting, in other words, the polymer according to the invention is put into solution in a suitable solvent such as cresol, or N-methylpyrrolidone or phenol, then poured onto a flat surface such as a plate of glass, then dried in order to form a film with a thickness of, for example, 5 to 200$\mu$.

In a particularly advantageous embodiment, the membranes, according to the process and device of the invention, have thicknesses considerably below those of membranes according to the prior art used in analogous semi-permeable processes and devices, and the thickness of the membranes will be preferably, according to the invention, be from 1 to 100$\mu$ and even more preferably 50 $\mu$, although it is preferably 100 to 200$\mu$, and even more preferably 200$\mu$, in membranes according to the prior art. The specific properties conferred on the membranes by the specific polyimides of formula (I) according to the invention have been described above.

The lower thickness, with equivalent or even superior mechanical strength, leads to, for example, a lower ohmic drop and, as a result, better overall yield in the process.

In the same way, it is possible to considerably reduce the quantities of sulphonated polyimide used in the process and device according to the invention, by forming membranes in the form of porous polymer structures, for example, in PTFE (polytetrafluoroethylene) or in polyimide or even polypropylene, or porous structures obtained, for example, from glass or carbon cloth or matting, which provide the necessary mechanical strength and which are impregnated with the polymers according to the invention. Thanks to the excellent properties of the polymers according to the invention, one thus manages to reduce the thickness of the equivalent membrane and one minimises, as a consequence, the associated ohmic drops.

The process according to the invention may be chosen from all of the known separation processes that use semi-permeable membranes.

The process according to the invention is chosen, preferably, from semi-permeable membrane separation processes in which the separation is achieved under the action of an electrical field.

Amongst the semi-permeable membrane separation processes according to the invention one can cite, for example, dialysis, electro-dialysis, osmosis, reverse osmosis, electro-osmosis, electrolysis, and any other electrochemical process using a separating membrane between the anodic and cathodic compartments.

The process according to the invention allows, according to a particularly advantageous aspect, one to treat extremely acidic pH or very oxidising media.

By very acidic is generally meant media with a pH below 1.

The very acidic media treated are generally aqueous solutions of inorganic and/or organic acids, such as hydrochloric acid, nitric acid, sulphuric acid, hydrofluoric acid or a mixture of these acids at a concentration of, for example, $10^{-5}$ to $10^{-1}$ to mol/l.

The process according to the invention may be applied to the concentration in metals and/or salt and/or other compounds, such as acids, bases or others, of all types of media, for example, effluents and, in particular, aqueous effluents; the metals may be chosen, for example, from nickel, copper, silver, etc., the salts can be chosen, for example, from NaCl, $MgSO_4$, $CaSO_4$, $CUCl_2$, $CrCl_2$, $ZnSO_4$, $CuSO_4$, $AgNO_3$, etc.

The process according to the invention may, in particular, be a sea water or brackish water desalination process.

In a more precise manner, and thanks to the unexpected permselectivity and selectivity properties of the membranes according to the invention, associated with their other properties, such as conductivity and resistance in acidic media, the process according to the invention will, notably, be a dialysis or electro-dialysis process applied to dialysis and electro-dialysis processes in areas such as the recovery of effluents containing metals, the desalination of sea water, the concentration of salt in sea water, the concentration of dilute solutions, etc.

The process according to the invention may also be an osmosis or electro-osmosis process that allows a substrate to be oxidised, such as an organic acid, or the dissolution of a metal oxide, by an electro-generated transmitter, such as an Ag II ion; this process is generally used in a very acidic medium, such as that described above.

The process according to the invention may also be a process for recovering metals, such as one of those cited above, by electrolysis.

The process according to the invention may also be a concentration process of any type of solution by electro-dialysis.

Finally, the process according to the invention may be any other electrochemical process, in which a separating membrane is used between an anode and a cathode.

The invention also concerns a device for the application of the process according to the invention, whereby such a device only essentially differs from devices of the prior art by the fact that one uses a specific membrane according to the invention, instead of and in place of the membranes used in devices of the prior art.

The structure of such devices is known in itself and only requires minimum adaptations in order to receive the membranes of the invention.

It should however be noted that, due to the excellent properties of the membranes according to the invention, linked notably to the excellent properties of sequenced polyimides with formula (I), the cost of such devices will be less, their size possibly reduced, their energy consumption reduced and their operational life extended.

Finally, the invention concerns the use of a membrane, as described above, in a semi-permeable membrane process or device.

The invention will now be described in more detail, using as references the attached diagrams, in which:

A BRIEF DESCRIPTION OF THE DRAWINGS

Figure 1:
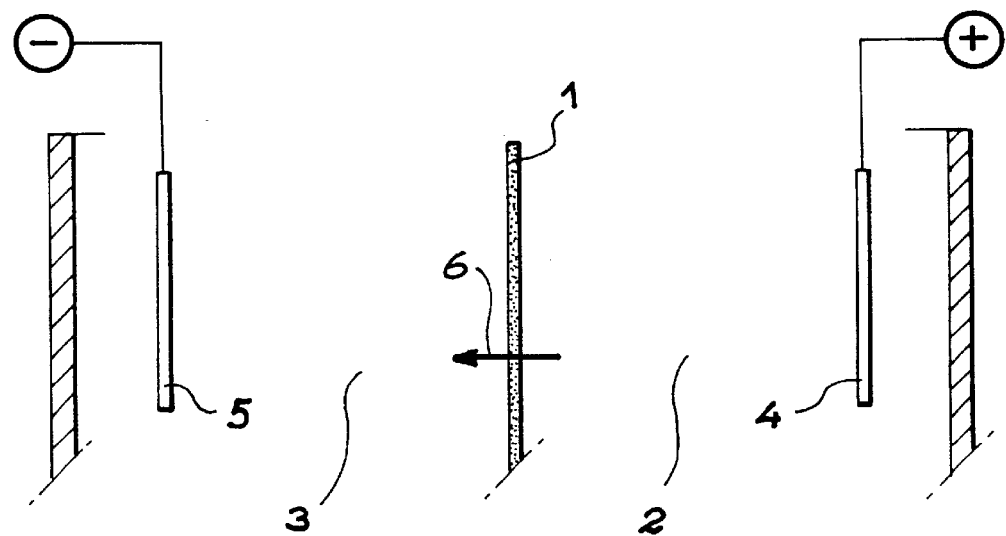
FIG. 1 is a very schematic section of an electrolysis cell according to the invention comprising a sulphonated polyimide membrane.

In FIG. 1, a very schematic sectional view of an electrolysis cell comprising a sulphonated polyimide membrane according to the invention has been represented.

The sulphonated polyimide membrane (1) is used as a membrane to separate the anodic (2) and cathodic (3) compartments provided, respectively, with an anode (4) and a cathode (5).

The anode may be, for example, made out of titanium, while the cathode is, for example, made out of copper.

The cathodic compartment is filled with an electrolyte made up of, for example, a solution, and preferably, an aqueous solution of a metallic salt, for example a salt of Ni, chosen from the chlorides, sulphates, nitrates, of these metals; the anodic compartment is filled with an electrolyte made up with, for example, an acid such as $H_2SO_4$.

When a current is applied to the electrodes, the metal $Ni^{2+}$ ions in the cationic compartment are reduced into Nickel, which is recovered at the cathode, while oxygen is liberated at the anode (7), and the protons migrate through the membrane, forming HCl (6).

Due to the excellent $H^+$/metal ion selectivity of the membranes according to the invention, the escape of the metal ion (passage of the ion into the anodic compartment) is very considerably reduced compared to membranes of the prior art, for example, Nafion. The metal recovery yield is considerably increased, while the energy savings are consequent.

Figure 2:
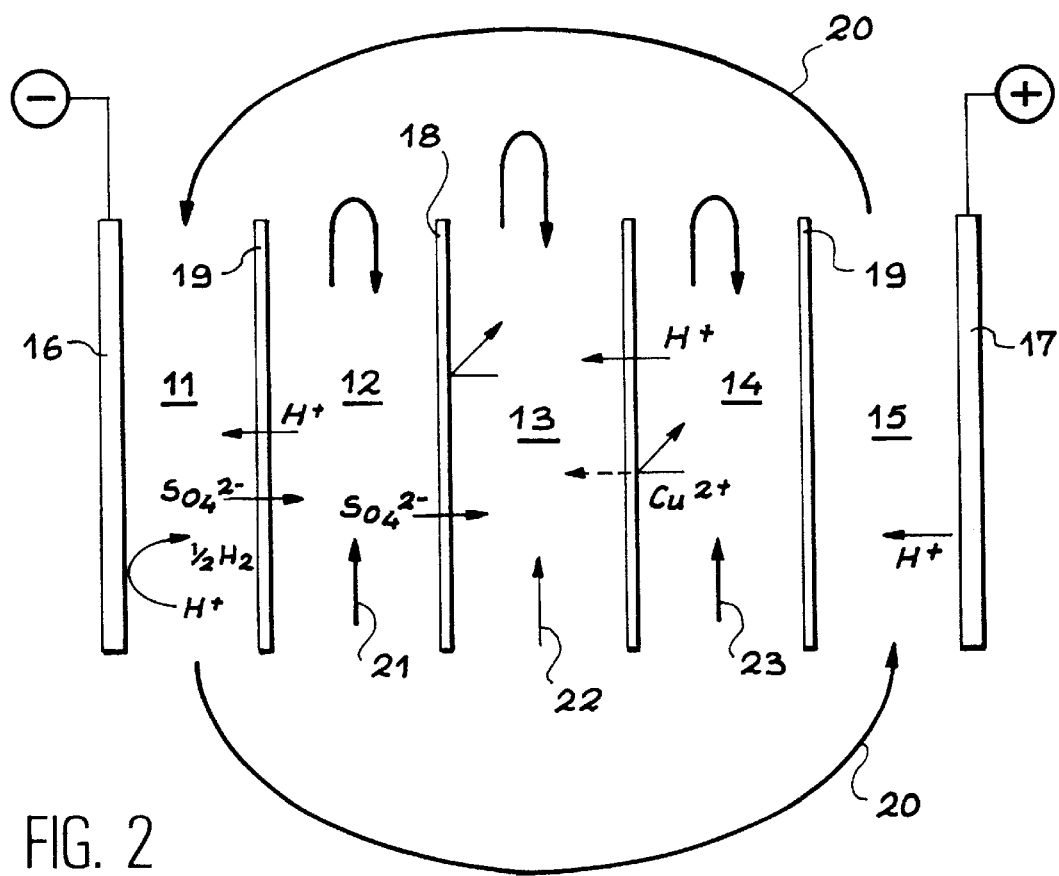
FIG. 2 is a very schematic section of an electro-dialysis cell according to the invention comprising a sulphonated polyimide membrane.

In FIG. 2, a schematic sectional view of an electrodialysis cell according to the invention, comprising a sulphonated polyimide membrane, is shown.

This type of cell has a well known structure and includes, on the one hand, a cathode (16) and, on the other hand, an anode (17). Between the electrodes, cationic and anionic membranes are alternately intersected, which define 5 compartments labelled 10 to 15 in going from the cathode.

These are generally AMV type (18) commercially available Japanese membranes for the anionic membranes and CMV type for the cationic membranes.

As an example, the electrolytes that circulate in the compartments are made out of: electrodes compartment ((11) and (15) in series); $H_2SO_4$ 0.1 N (20), compartment (12); $H_2SO_4$ 0.1 N (21); compartment (13); $H_2SO_4$ 0.125 N (22); compartment (14) $H_2SO_4$ 0.375 N+$CU_sSO_4$ 0.125 N (23).

The invention will now be described by referring to the following examples, which are given as examples to illustrate the invention but which in no way limit the invention.

EXAMPLE 1

This example illustrates an oxidation process by an electro-generated transmitter according to the invention.

The electro-generated transmitter was an Ag (II) ion in the electrolysis cell where the anodic compartment contained an $AgNO_3$ and $HNO_3$ solution, the cathodic compartment contained a solution of $HNO_3$ and the electrodes were made out of platinum. Between the anodic and cathodic compartments was interposed, according to the invention, a separating membrane made out of a sequenced sulphonated polyimide obtained with sulphonated ODA diamines (copolymers with an exchange capacity of 1.26 milliequivalents per gram and an equivalent weight of 792 g/eq., obtained by the use of a naphthalenic anhydride) with the formula:

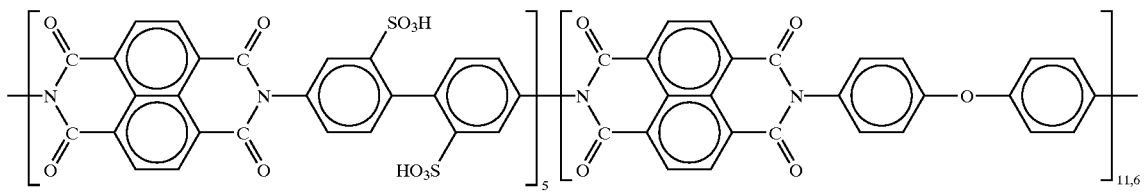

Whose thickness was around $50\mu$.

This separating membrane made it possible to avoid parasite recombination or linking reactions between the reducing species (nitrous acid) produced at the cathode and oxidising species produced at the anode (Ag (III)), and to transfer electricity. The anolyte was a concentrated solution of nitric acid at 4 mol/l and the catholyte was a solution of nitric acid at 12 mole/l.

The results obtained are summarised in Table 1 below.

EXAMPLE 2 (COMPARATIVE)

Example 1 was repeated under the same conditions, except that the membrane used was a Nafion® 117 membrane with the formula:

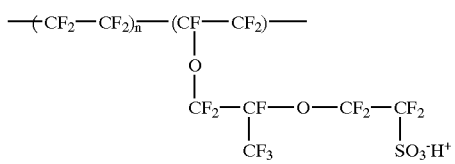

And a thickness of around 200μ.

The results obtained are summarised in Table 1 below:

TABLE 1

| | Nafion 117 | Sulphonated polyimides |
|---|---|---|
| Surface resistance (Ωcm$^2$) | 0.3 | 0.24 |
| Permselectivity $t_{NO3}$ | $10^{-2}$ | $10^{-2}$ |
| Silver (HNO$_3$) = 6 M | 2.3. $10^{-3}$ | 5.1. $10^{-3}$ |
| leakage $t_{Ag}$ (AgNO$_3$) = 0.05 M | | |
| (HNO$_3$) = 6 M | 4.4. $10^{-3}$ | 9.1. $10^{-3}$ |
| (AgNO$_3$) = 0.1 M | | |
| 100 mA/cm$^2$ (HNO$_3$) = 4 M | 8.3. $10^{-3}$ | 1.5. $10^{-2}$ |
| (AgNO$_3$) = 0.1 M | | |
| Osmosis $D_{H2O}$ (cm$^2$/s) | 2. $10^{-6}$ | 1. $10^{-6}$ |
| Electro-osmosis $t_{H2O}$ (H$_2$O/H) | 1 | 1 |

In this table, it can be seen that the properties of these two membranes were very close, with good permselectivity, at $10^{-2}$ for the $NO_3^-$ transfer number, good $H^+/Ag^+$ selectivity and a lower ohmic drop for the sulphonated polyimide membrane, according to the invention, due to its lower thickness.

In addition, the sulphonated polyimide membranes were absolutely not deteriorated. After several hours in operation, they had excellent chemical resistance in the very acidic medium used and their properties were maintained over this long period.

The unexpected superiority and properties of the membranes, according to the process of the invention, are thus demonstrated.

EXAMPLE 3

This example illustrates an electrolysis process according to the invention, in which a sulphonated polyimide membrane was used for the separation of the anodic and cathodic compartments.

The electrolysis cell was analogous to that represented schematically in FIG. 1. The cathodic compartment comprised a copper cathode and was filled with an aqueous solution of NiCl$_2$.

The anodic compartment was fitted with a titanium anode and was filled with sulphuric acid at a concentration of 1 mole/liter.

The separating membrane, with a thickness of 50μ, was made out of a sequenced sulphonated polyimide with the formula given in Example 1.

The electrolysis cell was run so that metallic nickel was recovered at the cathode over an operating period of 7 hours.

EXAMPLE 4 (COMPARATIVE)

Example 3 was repeated, by using the same electrolysis cell, the same anodes and cathodes and the same electrolytes in the anodic and cathodic compartments and the same operating conditions for the electrolysis cell, with the difference that the separating membrane was a Nafion® 112 membrane.

A reduction in the ohmic drop of around 10% was obtained in Example 3 compared to Example 4. After running for 7 hours under electrolysis, the chloride leakage was reduced by 35% and that of the Ni ions was reduced by 98% in Example 3 compared to Example 4.

The overall result was that more than 15% energy savings were made in this nickel recovery operation by using the specific sulphonated polyimide membrane according to the invention instead of, and in place of, Nafion® 112.

EXAMPLE 5

This example illustrates an electro-dialysis process and device according to the invention, in which a sequenced sulphonated polyimide membrane whose formula is given in Example 1 was used.

The electro-dialysis cell used corresponded more or less to the schematic diagram shown in FIG. 2.

The solution treated (23), which one wished to re-concentrate in acid, initially contained 0.125 N of CuSO$_4$ and 0.375 N of sulphuric acid, and which was circulating in compartment (14).

Thus, the composition of the electrolytes circulating in the compartments was: electrode compartments ((11) and (15) in series): H$_2$SO$_4$ 0.1 N (20), compartment (12): H$_2$SO$_4$ 0.1 N (21); compartment (13): H$_2$SO$_4$ 0.125 N (22); compartment (14): H$_2$SO$_4$ 0.375 N+CuSO$_4$ 0.125 N (23). The cell was run for 8 hours under various intensities corresponding to respective current densities of 30 mA/cm$^2$ and 50 mA/cm$^2$.

Table 2 below shows the concentration obtained in the central compartment (13) of the cell.

EXAMPLE 6 (COMPARATIVE)

The same experiment as in Example 5, under the same conditions, was repeated with a Nafion® 117 membrane.

The results are also shown in Table 2 below.

TABLE 2

Electro-dialysis separation tests. Final composition of the concentrate*.

| | VOLUME (1) | [H$^+$] (equiv. 1$^{-1}$) | [Cu$^{2+}$] (equiv. 1$^{-1}$) |
|---|---|---|---|
| 30 mA/cm$^{-2}$ | | | |
| Nafion | 0.283 | 0.806 | 0.274 |
| SP3 | 0.268 | 0.919 | 0.136 |
| 50 mA/cm$^{-2}$ | | | |
| Nafion | 0.309 | 1.14 | 0.340 |
| SP3 | 0.286 | 1.264 | 0.236 |

*The initial composition of the concentrate was 0.25 1 of H$_2$SO$_4$ at 0.125 equiv.1$^{-1}$.

The results in this table confirm the selectivity properties in terms of protonic transfer and the gain in efficiency provided by the specific membranes, according to the invention, compared to a Nafion® 117 type membrane of the prior art.

What is claimed is:

1. Semi-permeable membrane separation process, in which the said membrane(s) is (are) a sulphonated polyimide with the following general formula (I):

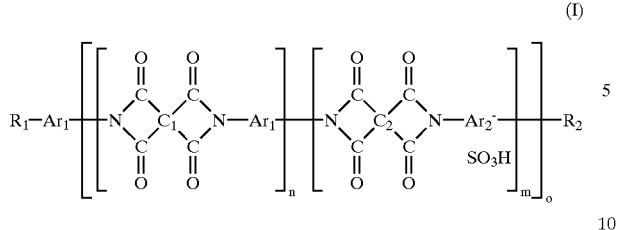

in which:
- the groups $C_1$ and $C_2$ may be identical or different, and each represent a tetravalent groups comprising at least one aromatic carbon ring, optionally substituted, having 6 to 10 carbon atoms and/or a heterocyclic ring with an aromatic character, optionally substituted, having 5 to 10 atoms and comprising one or several heteroatoms chosen from S, N or O: $C_1$ and $C_2$ each form, with the adjacent imide groups, rings with 5 or 6 atoms;
- the groups $Ar_1$ and $Ar_2$ may be identical or different, and each represent a divalent group comprising at least one aromatic carbon ring, optionally substituted, having 6 to 10 carbon atoms and/or a heterocyclic ring with an aromatic character, optionally substituted having 5 to 10 atoms and comprising one or several heteroatoms chosen from S, N or O; at least one of the said aromatic carbon and/or heterocyclic rings of $Ar_2$ being, in addition, substituted with at least one sulphonic acid group;
- where each of the groups $R_1$ and $R_2$ represent $NH_2$, or a group with the formula:

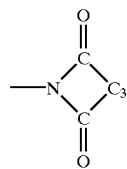

where $C_3$ is a divalent group comprising at least one aromatic carbon ring, optionally substituted, having 6 to 10 carbon atoms and/or a heterocyclic ring with an aromatic character, optionally substituted, having 5 to 10 atoms and comprising one or several heteroatoms chosen from S, N or O;

$C_3$ forming, with the adjacent imide group, a 5 or 6 atom ring; and where m represents a whole number between 2 and 20, n represents a whole number between 2 and 30, and o represents a whole number between 2 and 10.

2. Process according to claim 1, in which in the formula (I), the numbers m and n are chosen in such a way that the equivalent molecular weight, defined by the weight of polymer in grams per sulphonic acid equivalent, is between 500 and 2,500.

3. Process according to claim 1, in which the said sulphonated polyimide has a molecular weight of between 10,000 and 100,000.

4. Process according to claim 1, in which in the formula (I), $C_1$ and $C_2$ may be identical or different and each represent a benzene ring, optionally substituted by one or two substituents chosen from alkyl or alkoxy groups with 1 to 10 C atoms or halogen atoms, or several benzene rings, optionally substituted by one or several substituents chosen from alkyl or alkoxy groups with 1 to 10 C or halogen atoms, linked to each other by a single bond or by a divalent group;

$C_1$ and $C_2$ may also each represent a condensed polycyclic carbon group, optionally substituted by one or several substituents chosen from the alkyl or alkoxy groups with 1 to 10 C atoms or the halogen atoms;

$C_1$ and $C_2$ may also each represent a heterocyclic or a condensed heterocyclic with an aromatic character, and this heterocyclic is optionally substituted by one or several substituents chosen from the alkyl or alkoxy groups with 1 to 10 C atoms, or the halogen atoms;

$Ar_1$ and $Ar_2$ may be identical or different and each represent, for example, a divalent benzene ring with meta or para links, optionally substituted by one or several substituents chosen from the alkyl or alkoxy groups with from 1 to 10 C atoms or the halogen atoms, or several benzene rings, optionally substituted by one or several substituents chosen from the alkyl or alkoxy groups with from 1 to 10 C atoms or the halogen atoms, linked to each other by a single bond or by a divalent group;

$Ar_1$ and $Ar_2$ may also each represent a condensed polycyclic carbon group, optionally substituted by one or several substituents chosen from the alkyl or alkoxy groups with 1 to 10 C atoms, or the halogen atoms;

$Ar_1$ and $Ar_2$ may also each represent a heterocyclic or a condensed heterocyclic with an aromatic character, and this heterocyclic is optionally substituted by one or several substituents chosen from the alkyl or alkoxy groups with 1 to 10 C atoms, or the halogen atoms.

5. Process according to claim 1, in which in the formula (I), $C_3$ is a benzene or naphthalene ring, optionally substituted by one or several substituents chosen from the alkyl or alkoxy groups with 1 to 10 C atoms or the halogen atoms.

6. Process according to claim 4, in which the said divalent groups is chosen from:
- a divalent group derived from a linear or branched alkyl group with 1 to 10 C atoms, optionally substituted by one or several halogens chosen from F, Cl, Br or I and/or by one or several hydroxyl groups; a heteroatom chosen from O, S;
- a group

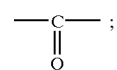

- a group

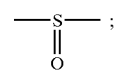

- a group

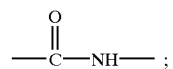

- a group

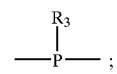

a group

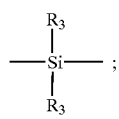

a group

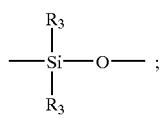

where $R_3$ is chosen from the alkyl groups with 1 to 10 C atoms.

7. Process according to claim 4, in which $C_1$ is a benzene ring and $C_2$ is two benzene rings linked to each other by an oxygen bridge.

8. Process according to claim 4, in which $C_1$ is made up of benzene rings linked by one or several perfluoroalkylene group(s) and $C_2$ is made up of benzene rings linked by one or several divalent perfluoroalkyl or perfluoroalkylene group (s).

9. Process according to claim 4, in which $C_1$ is a benzene ring and $C_2$ is a naphthalenic ring.

10. Process according to claim 4, in which $C_1$ and $C_2$ are both naphthalenic rings.

11. Process according to claim 4, in which $Ar_1$ is a diphenylmethane group and $Ar_2$ is a biphenyl-disulphonic group.

12. Process according to claim 4, in which $Ar_1$ is a benzene ring and $Ar_2$ is a biphenyl-disulphonic group.

13. Process according to claim 4, in which $Ar_1$ is a diphenylether group and $Ar_2$ is a biphenyl-disulphonic group.

14. Process according to claim 1, in which the permselectivity of the membrane is between 90 and 100%.

15. Process according to claim 1, in which the $H^+/M^{2+}$ selectivity, where Z is a whole number between 1 and 6, is between 0.70 and 0.95, the selectivity depending on the total concentration in cations.

16. Process according to claim 1, in which the selectivity and/or the permselectivity of the membrane is adapted by the synthesis of the sulphonated polyimide.

17. Process according to claim 1, in which the membrane has a thickness of between 1 and 100$\mu$.

18. Process according to claim 1, in which the membrane is porous and impregnated with sulphonated polyimide.

19. Process according to claim 1, chosen from the semi-permeable separation processes, in which the separation is performed under the action of an electrical field.

20. Process according to claim 1, in which the said process is chosen from dialysis, electro-dialysis, osmosis, reverse osmosis, electro-osmosis, electrolysis or electro-chemical devices using a separating membrane between the anodic and cathodic compartments.

21. Process according to claim 1, in which the medium treated is a medium with a pH less than 1 and/or a very oxidizing medium.

22. Semi-permeable membrane separation device in which the semi-permeable membrane(s) is (are) as claimed in claim 1.

23. Semi-permeable membrane separation device according to claim 22, in which the separation is performed under the action of an electrical field.

24. Device according to claim 22, in which the said device is chosen from dialysis, electro-dialysis, osmosis, reverse osmosis, electrolysis or electrochemical devices using a separating membrane between the anodic and cathodic compartments.

25. Process for separating at least one species contained in a media comprising contacting said sulphonated polyimide membrane, as claimed in claim 1, with said media in a semi-permeable membrane separation process.

* * * * *

UNITED STATES PATENT AND TRADEMARK OFFICE
CERTIFICATE OF CORRECTION

PATENT NO. : 6,596,838 B1
DATED : July 22, 2003
INVENTOR(S) : Michel Pineri et al.

It is certified that error appears in the above-identified patent and that said Letters Patent is hereby corrected as shown below:

Title page,
Item [75], first inventor should be corrected to: -- Michel Pineri, Montbonnot (FR) --.
Item [73], Assignee, should be corrected to:
-- Centre National de la Recherche Scientifique, Paris Cedex (FR) --.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,596,838 B1
DATED : July 22, 2003
INVENTOR(S) : Michel Pineri et al.

It is certified that error appears in the above-identified patent and that said Letters Patent is hereby corrected as shown below:

<u>Title page,</u>
Item [75], Inventor, should be corrected to -- Michel Pineri, Montbonnot (FR). --
Item [73], Assignee, should be corrected to -- Centre National de la Recherche Scientifique, Paris Cedex (FR) --.

Signed and Sealed this

Seventeenth Day of August, 2004

JON W. DUDAS
*Acting Director of the United States Patent and Trademark Office*